US012161916B1

(12) United States Patent
Simonds et al.

(10) Patent No.: US 12,161,916 B1
(45) Date of Patent: Dec. 10, 2024

(54) GOLF BALLS HAVING RADAR DETECTABLE MARKS AND METHODS OF MAKING SAME

(71) Applicant: Acushnet Company, Fairhaven, MA (US)

(72) Inventors: Vincent Simonds, Brimfield, MA (US); Matthew Hogge, Plymouth, MA (US); Michael Madson, Easton, MA (US); Michael McNamara, Fairhaven, MA (US); Kenneth Rebello, Acushnet, MA (US); Jedediah James, Dighton, MA (US); Michael Couto, New Bedford, MA (US)

(73) Assignee: Acushnet Company, Fairhaven, MA (US)

( * ) Notice: Subject to any disclaimer, the term of this patent is extended or adjusted under 35 U.S.C. 154(b) by 2 days.

(21) Appl. No.: 17/714,521

(22) Filed: Apr. 6, 2022

(51) Int. Cl.

| | |
|---|---|
| ***B41M 7/00*** | (2006.01) |
| ***A63B 37/00*** | (2006.01) |
| ***A63B 45/02*** | (2006.01) |
| ***B41M 1/40*** | (2006.01) |

(52) U.S. Cl.
CPC ........ *A63B 45/02* (2013.01); *A63B 37/00221* (2020.08); *B41M 1/40* (2013.01); *B41M 7/0081* (2013.01)

(58) Field of Classification Search
None
See application file for complete search history.

(56) References Cited

U.S. PATENT DOCUMENTS

| | | | |
|---|---|---|---|
| 4,284,276 | A | 8/1981 | Worst |
| 4,660,039 | A | 4/1987 | Barricks et al. |
| 6,217,463 | B1 | 4/2001 | Maruko et al. |
| 6,244,971 | B1 | 6/2001 | Mihran |
| 7,364,515 | B2 | 4/2008 | Kasashima |
| 9,795,832 | B2 | 10/2017 | Saegusa et al. |
| 10,611,181 | B1 | 4/2020 | Moylan |
| 10,918,915 | B1 | 2/2021 | Moylan |
| 2005/0070375 | A1 | 3/2005 | Savarese et al. |
| 2006/0122007 | A1 | 6/2006 | Savarese et al. |
| 2008/0182090 | A1 | 7/2008 | Rouse et al. |

(Continued)

FOREIGN PATENT DOCUMENTS

| | | |
|---|---|---|
| CN | 104083855 | 10/2014 |
| WO | 2011074247 | 6/2011 |

*Primary Examiner* — Joshua D Zimmerman
(74) *Attorney, Agent, or Firm* — Bradley Arant Boult Cummings LLP

(57) ABSTRACT

Golf balls having one or more marks for improving the detection and tracking thereof by radar systems and methods of applying the marks to the golf balls are provided. The methods of the present disclosure involve applying the radar detectable marks to a layer of the golf ball by pad printing. The methods described herein utilize a plurality of pad printing stations having multi-impact capabilities and reorientation mechanisms to apply the radar detectable marks to the golf ball layer. The use of the multi-impact pad printers combined with the rotational capabilities of the reorientation mechanisms enables precise delivery of the radar detectable marks in a consistent and repeatable manner over the entire surface of the golf ball layer and multi-pole printing within a wide print area on the golf ball layer.

12 Claims, 2 Drawing Sheets

(56) References Cited

U.S. PATENT DOCUMENTS

| | | | | |
|---|---|---|---|---|
| 2010/0293777 | A1 * | 11/2010 | Savarese | A63B 43/00 29/601 |
| 2011/0207553 | A1 | 8/2011 | Reid et al. | |
| 2013/0324310 | A1 | 12/2013 | Leech et al. | |
| 2014/0018194 | A1 | 1/2014 | Wachi | |
| 2015/0020377 | A1 | 1/2015 | Savarese et al. | |
| 2015/0087443 | A1 | 3/2015 | Kitazaki et al. | |
| 2021/0008417 | A1 * | 1/2021 | Tuxen | A63B 37/0022 |
| 2022/0161102 | A1 | 5/2022 | Hogge et al. | |

* cited by examiner

GOLF BALLS HAVING RADAR DETECTABLE MARKS AND METHODS OF MAKING SAME

FIELD OF THE INVENTION

The present disclosure relates generally to golf balls. More particularly, the present disclosure relates to golf balls having one or more marks for improving the detection and tracking thereof by radar systems and methods of applying the marks to the golf balls.

BACKGROUND OF THE INVENTION

Interest continues to grow in golf experiences that require a system for detecting golf ball launch conditions, such as golf simulators and golf equipment fitting. Many golfers wish to continually improve their game by analyzing their swing and flight path information of the golf ball after it is struck by the golf club. Systems for detecting golf ball launch conditions can help golfers analyze parameters, such as club speed, carry, ball velocity, spin, and launch angle. Radar tracking systems and the radar reflective stickers that are currently used for this purpose are limited, however, in their ability to accurately obtain launch condition data, for example, ball spin properties, in environments, and particularly indoor environments, where the ball travels a limited distance.

Radar reflective stickers are typically hand applied on the outer surface of the golf ball in order for radar tracking systems to obtain launch condition data. This limits the pattern geometries that can be applied on the surface of the golf ball. The limits on the available patterns of radar reflective stickers can adversely affect launch monitor performance and negatively affect the system's ability to accurately detect launch conditions. In addition, there are challenges associated with the use of the radar reflective stickers themselves. For instance, golfers, golf instructors, and golf ball manufacturers alike may have difficulties with accurate positioning of the stickers on the ball, alignment of the stickers relative to the golfer and tee, time and effort required to place the stickers on the ball, and lack of durability of the stickers, which further leads to a decrease in the quality of launch condition data and the need to replace the stickers.

Accordingly, there remains a need in the art for automated printing methods that allow for more expansive pattern geometries for radar reflective markers and the ability to print the radar reflective markers on a wider portion of the golf ball to increase accuracy of detecting launch conditions. There also remains a need for a golf ball that provides for improved quality of golf ball launch condition data collected by radar tracking systems, especially in limited travel distance environments, and enhanced experience for the end users of these radar tracking systems.

SUMMARY OF THE INVENTION

The problems expounded above, as well as others, are addressed by the following inventions, although it is to be understood that not every embodiment of the inventions described herein will address each of the problems described above.

In some embodiments, the present disclosure provides a method of printing a radar detectable mark on a golf ball, the method including transferring the golf ball to a pad printing station, wherein the pad printing station includes a printing pad and an image plate having an etching of the radar detectable mark with electrically conductive ink filled therein, wherein the etching of the radar detectable mark has a depth of about 15 μm to about 50 μm; applying the electrically conductive ink to the printing pad to provide an inked printing pad; contacting a portion of the surface of the golf ball with the inked printing pad to form the radar detectable mark; and rotating the golf ball to one or more unprinted surfaces to receive one or more additional radar detectable marks.

In this embodiment, the method may further include a step for contacting a second portion of the surface of the golf ball with the inked printing pad to form a second radar detectable mark. In some embodiments, the method may also further include, after the contacting step, drying the radar detectable mark using at least one of: forced ambient air or heated air having a temperature of about 60° F. or greater, wherein the heated air is a by-product of cooling a UV-curable light source. In further embodiments, the etching of the radar detectable mark has a depth of about 20 μm to about 47 μm. In still further embodiments, the electrically conductive ink includes a base resin and an electrically conductive material. In yet further embodiments, the base resin is selected from the group consisting of vinyl polymers, urethane polymers, acrylic polymers, epoxy polymers, and combinations of two or more thereof, and the electrically conductive material is selected from the group consisting of silver, conductive carbon, aluminum, graphene, nanotubes, nanometals, and combinations of two or more thereof. In some embodiments, the radar detectable mark has a thickness ranging from about 0.5 μm to about 5 μm. In further embodiments, the method may include applying an adhesion-promoting layer to the surface of the golf ball. In some embodiments, the radar detectable marks may have a resistivity of about 0.1 Ohms to about 2,500 Ohms, for example, about 5 Ohms to about 25 Ohms. In still further embodiments, the radar detectable marks may have a resistivity of about 5 Ohms or less. In some embodiment, the method may further include repeating the applying, contacting, and rotating steps until three portions, four portions, five portions, or six portions of the surface of the golf ball include at least one radar detectable mark.

In other embodiments, the present disclosure provides a method of printing a plurality of radar detectable marks on a surface of a golf ball, the method including providing a plurality of pad printing stations, wherein each pad printing station includes a printing pad and an image plate having an etching of the radar detectable mark with electrically conductive ink applied therein, wherein the etching of the radar detectable mark has a depth of about 10 μm to about 40 μm; transferring the golf ball to a first pad printing station, wherein the electrically conductive ink is applied to the printing pad to provide an inked printing pad; contacting a first portion of the surface of the golf ball with the inked printing pad to apply a first ink layer; repeating the contacting step to apply a second ink layer, wherein the first ink layer and the second ink layer form a first radar detectable mark on the first portion of the surface; rotating the golf ball to a second portion of the surface; transferring the golf ball to a second pad printing station; and contacting the second portion of the surface of the golf ball with the inked printing pad to form a second radar detectable mark on the second portion of the surface.

In this embodiment, the rotating step may further include rotating the golf ball about 90 degrees to about 180 degrees. In some embodiments, the etching of the radar detectable mark has a depth of about 15 μm to about 35 μm. In further embodiments, the first and second radar detectable marks have a resistivity of about 5 Ohms or less. In still further embodiments, the first and second radar detectable marks may have a resistivity of about 0.1 Ohms to about 2,500 Ohms, for example, about 5 Ohms to about 25 Ohms. In still further embodiments, the method may further include drying the first radar detectable mark and the second radar detectable mark using at least one of: forced ambient air or heated air having a temperature of about 60° F. or greater, wherein the heated air is a by-product of cooling a UV-curable light source. In yet further embodiments, the method may further include applying an adhesion-promoting layer to the surface of the golf ball. In still further embodiments, the method may further include repeating the rotating, transferring, and contacting steps until six portions of the surface of the golf ball include at least one radar detectable mark. In further embodiments, the surface of the golf ball is any layer of the golf ball other than an outermost surface.

In still other embodiments, a method of printing a plurality of radar detectable marks on a surface of a golf ball is provided, the method including providing a plurality of pad printing stations, wherein each pad printing station includes a printing pad and a first image plate and a second image plate each having an etching of the radar detectable mark with electrically conductive ink applied therein, wherein the etching of the first image plate has a first depth and the etching of the second image plate has a second depth, wherein the first depth and the second depth range from about 10 μm to about 40 μm and the first depth and the second depth are different; transferring the golf ball to a first pad printing station; applying the electrically conductive ink from the first image plate to the printing pad to provide an inked printing pad; contacting a first portion of the surface of the golf ball with the inked printing pad to apply a first ink layer; applying the electrically conductive ink from the second image plate to the printing pad; contacting the first portion of the surface of the golf ball with the inked printing pad to apply a second ink layer, wherein the first ink layer and the second ink layer form a first radar detectable mark on the first portion of the surface; rotating the golf ball to a second portion of the surface; transferring the golf ball to a second pad printing station; and contacting the second portion of the surface of the golf ball with the inked printing pad to form a second radar detectable mark on the second portion of the surface.

In this embodiment, the first depth is about 10 μm to about 20 μm and the second depth is about 20 μm to about 30 μm. In further embodiment, the method may include drying the first radar detectable mark and the second radar detectable mark using at least one of: forced ambient air or heated air having a temperature of about 60° F. or greater, wherein the heated air is a by-product of cooling a UV-curable light source. In still further embodiments, the method may also include applying a cover layer over the surface of the golf ball. In some embodiments, the rotating step includes rotating the golf ball about one or more axes without substantially moving the center of the golf ball.

BRIEF DESCRIPTION OF THE DRAWINGS

Further features and advantages of the invention can be ascertained from the following detailed description that is provided in connection with the drawings described below.

DETAILED DESCRIPTION OF THE INVENTION

Figure 1:
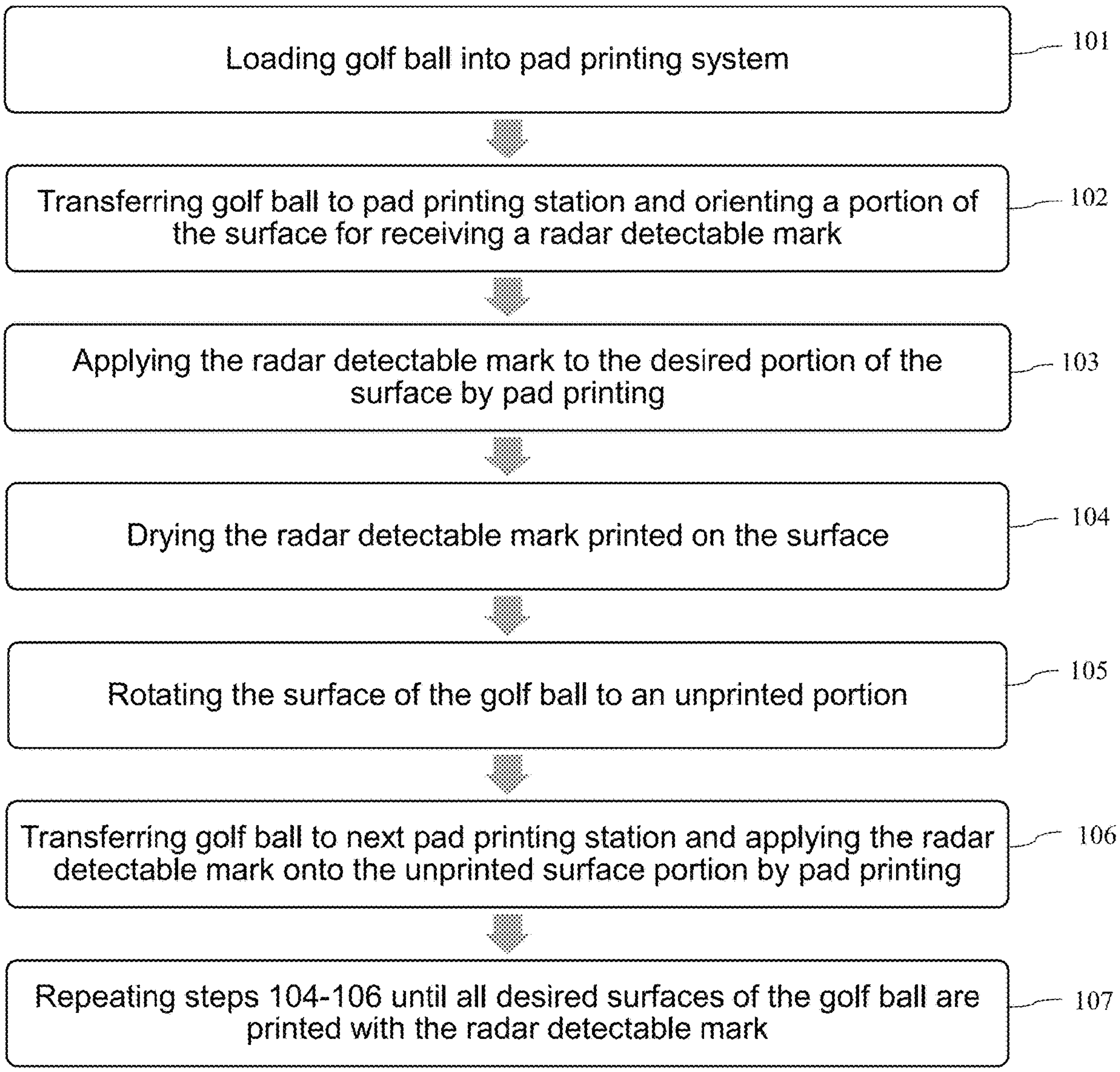
FIG. 1 is a flowchart illustrating the steps of a method for applying a radar detectable mark to a surface of a golf ball according to an exemplary embodiment of the present disclosure.
Figure 2A:
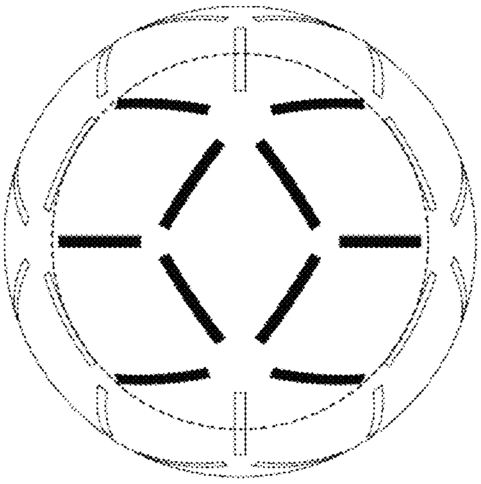
FIG. 2A is a top view of a golf ball having a pattern of radar detectable marks according to an exemplary embodiment of the present disclosure.
Figure 2B:
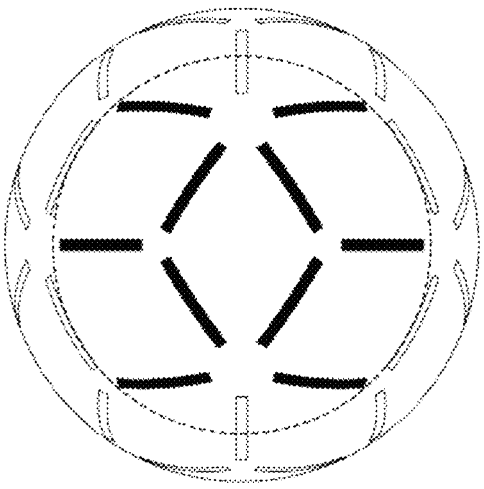
FIG. 2B is a bottom view of the golf ball having the pattern of radar detectable marks shown in FIG. 2A.
Figure 2C:
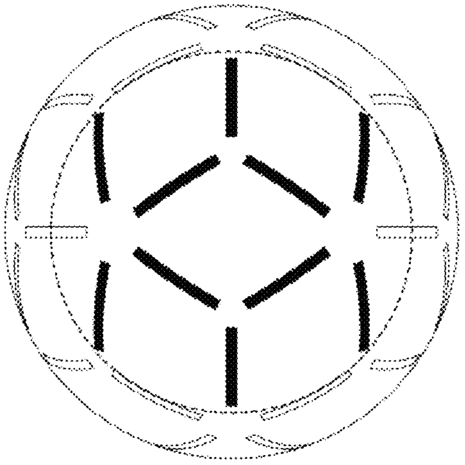
FIG. 2C is a front view of the golf ball having the pattern of radar detectable marks shown in FIG. 2A.
Figure 2D:
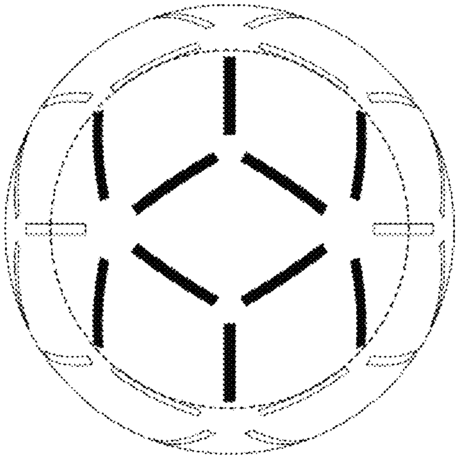
FIG. 2D is a rear view of the golf ball having the pattern of radar detectable marks shown in FIG. 2A.
Figure 2E:
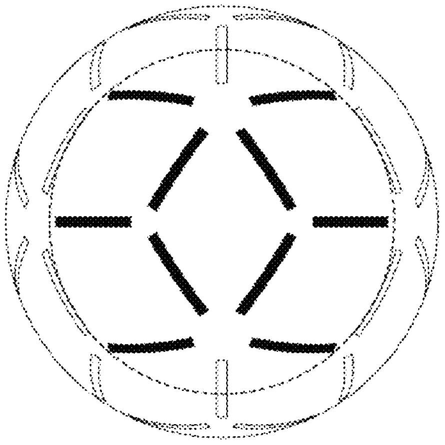
FIG. 2E is a left view of the golf ball having the pattern of radar detectable marks shown in FIG. 2A.
Figure 2F:
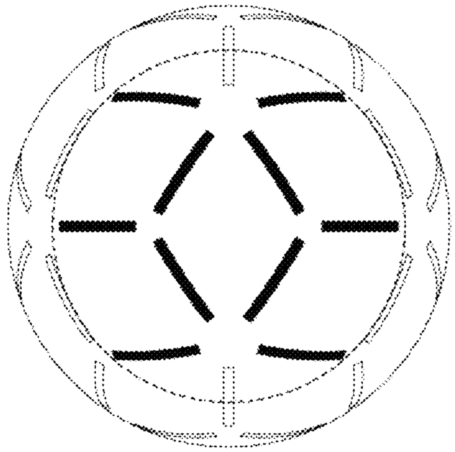
FIG. 2F is a right view of the golf ball having the pattern of radar detectable marks shown in FIG. 2A.

Unless otherwise defined, all terms (including technical and scientific terms) used herein have the same meaning as commonly understood by one of ordinary skill in the art of this disclosure. It will be further understood that terms, such as those defined in commonly used dictionaries, should be interpreted as having a meaning that is consistent with their meaning in the context of the specification and should not be interpreted in an idealized or overly formal sense unless expressly so defined herein. Well known functions or constructions may not be described in detail for brevity or clarity.

The terms "about" and "approximately" shall generally mean an acceptable degree of error or variation for the quantity measured given the nature or precision of the measurements. Numerical quantities given in this description are approximate unless stated otherwise, meaning that the term "about" or "approximately" can be inferred when not expressly stated.

The terminology used herein is for the purpose of describing particular embodiments only and is not intended to be limiting. As used herein, the singular forms "a", "an" and "the" are intended to include the plural forms as well (i.e., at least one of whatever the article modifies), unless the context clearly indicates otherwise.

The terms "first," "second," "third," and the like are used herein to describe various features or elements, but these features or elements should not be limited by these terms. These terms are only used to distinguish one feature or element from another feature or element. Thus, a first feature or element discussed below could be termed a second feature or element, and similarly, a second feature or element discussed below could be termed a first feature or element without departing from the teachings of the present disclosure.

Methods of Applying Radar Detectable Marks

The present disclosure provides methods of applying a radar detectable mark to a surface of a golf ball layer. The term, "radar detectable mark," refers to any continuous or non-continuous marking having a measurable level of conductivity. The methods of the present disclosure involve applying the radar detectable marks to the golf ball layer by pad printing. Pad printing is the process of transferring a two-dimensional image onto a three-dimensional part, such as a golf ball layer. The methods described herein utilize a plurality of pad printing stations having multi-impact capabilities and reorientation mechanisms to apply the radar detectable marks to the golf ball layer. The use of the multi-impact pad printers combined with the rotational capabilities of the reorientation mechanisms enables precise delivery of the radar detectable marks in a consistent and repeatable manner over the entire surface of the golf ball layer. The rotational capabilities of the pad printing system also enable multi-pole printing within a wide print area on the golf ball, which opens the design space for intricate indicia patterns of the radar detectable marks.

FIG. 1 is a flowchart illustrating the steps of a method for applying radar detectable marks to a golf ball layer according to an exemplary embodiment of the present disclosure. At step 101, a golf ball is loaded into a pad printing system. The pad printing system contemplated by the present disclosure includes a plurality of pad printing stations configured to apply a radar detectable mark to the surface of the golf ball layer via pad printing and a plurality of reorienting stations positioned therebetween. The reorienting stations are configured to rotate the golf ball having the radar detectable mark applied thereto to a different orientation such that a new, unprinted portion of the surface of the golf ball layer can be printed at the next pad printing station. The pad printing system may also include a plurality of drying stations for drying the printed areas of the golf ball layer.

The number of pad printing stations may vary depending on the pattern of the radar detectable mark to be printed on the golf ball layer. In some embodiments, the pad printing system of the present disclosure includes more than one printing station. Each pad printing station utilizes an etched image plate having a negative etching of the desired radar detectable mark. The etchings within the image plates are filled with a suitable electrically conductive ink for printing the radar detectable mark onto the surface of the golf ball layer. The image plate, typically, is made of a tough material such as metal, steel, other alloy or photopolymer, which normally has a uniform thickness except for the area defining the negative etched image. The image plate may optionally be coated with one or more protectant layers or materials to enhance its useful life.

Each pad printing station also includes a plurality of printing pads configured for transferring the electrically conductive ink from the etched image plate to the surface of the golf ball. The electrically conductive ink released from the printing pad forms, on the spherical surface of the ball layer, an image corresponding to that of the etched cavity on the image plate. The printing pads may be made from a resilient material, such as silicone rubber, which desirably picks up the electrically conductive ink from the etched cavity of the image plate and releases all of the ink lifted off when brought into contact with the surface of the golf ball layer. With the use of pad printing stations equipped with a plurality of printing pads, the pad printing system is capable of printing multiple different images and/or materials.

Suitable electrically conductive inks for printing the radar detectable marks of the present disclosure include a base resin and an electrically conductive material. The electrically conductive ink may be water-borne or solvent-borne and may be a 1-component or 2-component ink. In some embodiments, the base resin of the ink includes vinyl polymers, urethane polymers, acrylic polymers, epoxy polymers, and combinations of two or more thereof. In further embodiments, the electrically conductive material of the ink is selected from silver, conductive carbon, aluminum, graphene, nanotubes, nanometals, and combinations of two or more thereof. In some embodiments, the electrically conductive material of the ink is silver. In other embodiments, the electrically conductive material may be conductive carbon. Particularly suitable inks are those capable of producing a radar detectable mark having a resistivity of about 0.1 Ohms to about 2,500 Ohms. In some embodiments, suitable inks are those capable of producing a radar detectable mark having a resistivity less than about 5 Ohms, for instance, about 0.1 Ohms to about 5 Ohms. In further embodiments, suitable inks are those capable of producing a radar detectable mark having a resistivity of about 0.5 Ohms to about 25 Ohms. In still further embodiments, suitable inks are those capable of producing a radar detectable mark having a resistivity of about 1 Ohm to about 10 Ohms. In yet further embodiments, suitable inks are those capable of producing a radar detectable mark having a resistivity of about 5 Ohms to about 7 Ohms. Non-limiting examples of suitable commercially available inks are Ink Lab 303 silver conductive ink, commercially available from ITW Trans Tech; silver inks, conductive carbon inks, aluminum inks, silver/carbon blend inks, and aluminum/carbon blend inks, commercially available from Creative Materials Inc. In some embodiments, the ink and the radar detectable mark formed therefrom may be transparent or opaque.

In embodiments of the present disclosure where the golf ball may include more than one radar detectable mark on a single layer, the electrically conductive ink to form one mark may be the same as or different from the electrically conductive ink used to form another mark. In embodiments where the golf ball includes at least two layers having one or more radar detectable marks disposed on a surface thereof, the electrically conductive ink used to form a mark on one layer may be the same as or different from the electrically conductive ink used to form a mark on another layer.

The pad printing system may also include a plurality of reorienting stations. After a portion of the surface of the golf ball layer is printed, the golf ball may be rotated about any axis on the ball to a different axis such that the golf ball is reoriented for printing on another portion of the surface of the ball layer, preferably on another unprinted surface portion. In some embodiments, the pad printing system includes a reorienting station positioned between each pad printing station. In this embodiment, the total number of reorienting stations in the pad printing system is one less than the total number of pad printing stations. For instance, in a pad printing system having four pad printing stations, the system may include three reorienting stations positioned in between each of the four pad printing stations. In further embodiments, the pad printing system may also include one or more drying stations. The drying stations may be positioned within the system such that the printed areas of the surface of the golf ball layer may be sufficiently dried.

At step 102, the golf ball is transferred to a first pad printing station and oriented for receiving the radar detectable mark on a suitable portion of the surface. The surface on which the radar detectable mark is applied can be any surface of any layer of a golf ball having any number of layers. In one embodiment, the methods of the present disclosure are designed to allow for the placement of the radar detectable mark on a surface other than the outer surface of the ball because it is beneficial to some golfers to obtain reliable launch condition data using a golf ball that looks the same on the outside as a conventional golf ball. Thus, in some embodiments, the radar detectable mark is disposed on any surface of any layer of the golf ball other than the outermost surface. In some embodiments, the radar detectable mark is disposed on an outer surface of an inner core layer. In other embodiments, the radar detectable mark is disposed on an inner or outer surface of an intermediate layer, such as an outer core layer or an inner cover layer. In still other embodiments, the radar detectable mark may be disposed on more than one layer. For example, the radar detectable mark may be disposed on at least two layers of the golf ball.

In some embodiments, before printing the radar detectable mark on the golf ball layer, the methods of the present disclosure may include applying an adhesion-promoting coating to the layer on which the radar detectable mark will be disposed. These coatings can promote adhesion of the radar detectable mark to the surface of the golf ball layer. In this embodiment, the adhesion-promoting coating is applied to the surface of the golf ball layer and the radar detectable mark is disposed on the layer on top of the adhesive coating.

For purposes of the present disclosure, the radar detectable mark is considered to be disposed on the surface of a layer regardless of whether a coating has previously been applied to the surface. In other words, if an adhesive coating is applied to a surface of a layer, and the radar detectable mark is then applied on top of the adhesive coating, the radar detectable mark is considered to be disposed on the surface of the layer, even though an adhesive coating is present therebetween. Likewise, if a coating is present between two layers of the ball, the layers are still considered to be adjacent to each other, even though a coating may be present therebetween.

Step 103 includes applying the radar detectable mark onto the desired portion of the surface of the golf ball layer. This step is performed by pad printing, as described above. In this embodiment, the etched image plate is filled with the electrically conductive ink and excess ink is scraped off such that only a layer of ink is within the negative etching of the image of the desired radar detectable mark. The printing pad may then be lowered and pressed onto the inked image plate to lift the electrically conductive ink off of the etched ink filled cavity onto the printing pad. The electrically conductive ink lifted from the etched image plate defines the shape of the radar detectable mark. The inked printing pad is then lowered and pressed onto the surface of the golf ball layer, thereby releasing the ink from the pad to the golf ball layer. The electrically conductive ink released from the printing pad forms, on the surface of the golf ball layer, the radar detectable mark corresponding to that of the negative etching.

In some embodiments, the method includes applying one or more additional electrically conductive ink layers to the same portion of the surface of the golf ball layer to create a radar detectable mark having sufficient radar reflectivity and/or durability. For example, the printing pad may be pressed onto the same surface of the golf ball layer at least twice to form a radar detectable mark of sufficient reflectivity and durability. In this embodiment, the steps of lifting the electrically conductive ink off the inked image plate and pressing the ink onto the surface of the golf ball layer to form the shape of the radar detectable mark can be repeated to form a more durable and reflective mark. As used herein, the steps of lifting the electrically conductive ink off the inked image plate and pressing the ink onto the surface of the golf ball layer may collectively be referred to as a single "pad print hit." In some embodiments, the step of applying the radar detectable mark onto the surface of the golf ball layer may be repeated at least twice to the same area of the surface of the golf ball layer with the same marking. For instance, the radar detectable mark can be formed from a first pad print hit that applies a first ink layer followed by a second pad print hit that applies a second ink layer to the same area of the surface of the golf ball layer. In other embodiments, the step of applying the radar detectable mark onto the surface of the golf ball layer may be repeated at least three times to the same area of the surface of the golf ball layer with the same marking. For example, the radar detectable mark can be formed from a first pad print hit that applies a first ink layer followed by a second pad print hit that applies a second ink layer followed by a third pad print hit that applies a third ink layer to the same area of the surface of the golf ball layer.

The depth of the image etch on the image plate may vary depending on the radar detectable mark to be formed and the desired number of pad print hits used to form the radar detectable mark. For example, an image plate intended for use in forming a radar detectable mark from a single pad print hit may require an image etch depth greater than an image plate intended for use in forming a radar detectable mark from multiple pad print hits. In some embodiments where the method of the present disclosure involves forming a radar detectable mark from a single pad print hit, the image plate may have an image etch depth of about 15 μm to about 50 μm. For example, the image plate may have an image etch depth of about 20 μm to about 47 μm. In other embodiments, the image plate may have an image etch depth of about 25 μm to about 40 μm. In still other embodiments, the image plate may have an image etch depth of about 30 μm to about 38 μm. In yet other embodiments, the image plate may have an image etch depth of about 47 μm.

In other embodiments where the method of the present disclosure involves forming a radar detectable mark from multiple pad print hits, the image etch depth may be less than the image etch depth described above for a single pad print hit. In some embodiments where the method of the present disclosure involves forming a radar detectable mark from two pad print hits, the image plate may have an image etch depth of about 10 μm to about 40 μm. For instance, the image plate may have an image etch depth of about 15 μm to about 35 μm. In other embodiments, the image plate may have an image etch depth of about 20 μm to about 30 μm. In still other embodiments, the image plate may have an image etch depth of about 22 μm to about 28 μm. In yet other embodiments, the image plate may have an image etch depth of about 17 μm. In still other embodiments, the image plate may have an image etch depth of about 27 μm.

In further embodiments where the method of the present disclosure involves forming a radar detectable mark from three pad print hits, the image plate may have an image etch depth of about 8 μm to about 25 μm. For example, the image plate may have an image etch depth of about 10 μm to about 20 μm. In other embodiments, the image plate may have an image etch depth of about 12 μm to about 18 μm. In still further embodiments, the image plate may have an image etch depth of about 15 μm.

In some embodiments, where the method involves multiple pad print hits, each pad print hit may be performed with the same image plate such that the image etch depth is consistent for each pad print hit. In other embodiments, each pad print hit may be performed with different image plates having different image etch depths. For example, a radar detectable mark may be formed by a first pad print hit using an image plate having an image etch depth of about 10 μm to about 20 μm, preferably about 17 μm, followed by a second pad print hit using an image plate having an image etch depth of about 20 μm to about 30 μm, preferably about 27 μm.

The radar detectable mark printed on the surface of the golf ball layer may have a film thickness ranging from about 0.5 μm to about 5 μm. In other embodiments, the radar detectable mark printed on the surface of the golf ball layer may have a film thickness ranging from about 0.75 μm to about 4.5 μm. In still other embodiments, the radar detectable mark printed on the surface of the golf ball layer may have a film thickness ranging from about 1 μm to about 4 μm. In further embodiments, the radar detectable mark printed on the surface of the golf ball layer may have a film thickness ranging from about 2 μm to about 3 μm.

After the radar detectable mark is applied to the desired portion of the surface of the golf ball layer, the method includes a step for drying the radar detectable mark printed on the surface of the golf ball layer (step 104). In some embodiments, the radar detectable mark may be dried by using forced ambient air or heated air. The heated air may have a temperature of about 60° F. or greater. For example, the heated air applied to the radar detectable mark may have a temperature of about 80° F. or greater. In other embodiments, the radar detectable mark may be dried using forced air that is a by-product of cooling a UV-curable light source. In still other embodiments, the radar detectable mark may be cured, for example, by passing the golf ball through a radiation curing device. The radiation curing device contains at least one radiation source that can cure curable inks, such as the electrically conductive ink to form the radar detectable mark. Radiation sources include, but are not limited to, UV radiation, visible radiation and electron beam radiation and may be administered in any combination and in any order.

After drying, the golf ball may be rotated so that a new, unprinted portion of the surface may be printed with a radar detectable mark (step 105). In this embodiment, the golf ball may be transferred from the first pad printing station to a reorientation station. At the reorientation station, the golf ball is rotated along any axis to a different axis for printing on another portion of the surface of the ball layer, preferably on another unprinted surface portion. For example, the golf ball may be rotated along the horizontal axis, the vertical axis, or both to one or more desired orientations to receive the radar detectable mark without substantially moving the center of the golf ball. The degree of rotation may vary depending on the desired pattern of the radar detectable mark. In some embodiments, the degree of rotation may range from about 10 degrees to about 320 degrees. In other embodiments, the degree of rotation may range from about 45 degrees to about 270 degrees. In still other embodiments, the degree of rotation may range from about 90 degrees to about 180 degrees. For example, in one embodiment, the golf ball may be rotated about 90 degrees to enable printing at each pole of the golf ball. In other embodiments, the golf ball may be rotated about 30 degrees. In still other embodiments, the golf ball may be rotated about 45 degrees. In yet other embodiments, the golf ball may be rotated about 60 degrees.

After the golf ball is rotated to a different orientation, the golf ball is transferred to the next pad printing station for further printing (step 106). The desired radar detectable mark can be printed on the new, unprinted surface portion of the golf ball layer using the pad printing techniques described above. The drying, reorientation, and printing steps can be repeated until all desired surfaces of the golf ball layer are printed with the radar detectable mark (step 107). For instance, in some embodiments, a manufacturer may desire a pattern of the radar detectable mark that is printed across the entire surface of the golf ball layer. In this embodiment, the method of the present disclosure enables "six-pole" printing where the golf ball layer is divided into six sections that each correspond to the face of a cube and the pattern is printed on each face. As the golf ball is transferred through the pad printing system, the golf ball layer may be rotated about 90 degrees at each reorientation station such that the radar detectable mark can be applied to all six faces of the golf ball layer.

In some embodiments, the golf ball may be reoriented and undergo two printing steps such that at least two surface portions of the golf ball layer are printed with a radar detectable mark. In other embodiments, the golf ball may be reoriented and undergo three printing steps such that at least three surface portions of the golf ball layer are printed with a radar detectable mark. In still other embodiments, the golf ball may be reoriented and undergo four printing steps such that at least four surface portions of the golf ball layer are printed with a radar detectable mark. In yet other embodiments, the golf ball may be reoriented and undergo five printing steps such that at least five surface portions of the golf ball layer are printed with a radar detectable mark. In further embodiments, the golf ball may be reoriented and undergo six printing steps such that six portions of the golf ball layer (for example, each pole of the golf ball) are printed with a radar detectable mark.

Once the desired pattern of the radar detectable mark is printed on the surface of the golf ball layer, the method may optionally include applying an additional adhesion-promoting coating to the printed golf ball layer to improve adhesion of topcoats and cover layers. In some embodiments, the adhesion-promoting coating improves the adhesion of the electrically conductive ink to a topcoat (for example, a urethane topcoat) or to an overcoat (for example, a water-based urethane coat or solvent-based coat) when such coats are applied over the dried radar detectable mark. In other embodiments, the method may include forming a cover layer over the printed golf ball layer to form a finished golf ball.

The methods of the present disclosure may optionally include a step for inspecting the golf ball layer after the radar detectable mark has been applied to the surface. The inspecting step may include analyzing the radar detectable mark to determine whether it is within predetermined acceptable parameters. In some embodiments, the golf ball layer may be inspected after each printing step. In other embodiments, the golf ball layer may be inspected after all desired surface portions have been printed with the radar detectable mark. The inspection step may be used to determine conformity of the radar detectable marks to predetermined standards. In addition, utilizing an inspection step allows for constant monitoring of the printed golf ball layers, in-line with the printing stations, so that early signs of undesirable printing conditions can be attended. In this embodiment, the pad printing system may include one or more automated inspection systems and imaging systems configured to analyze various characteristics of the printed radar detectable mark, including its cosmetic or aesthetic appearance on the golf ball layer and the accuracy in which the mark is applied.

While the methods and systems disclosed herein have been described using pad printing techniques, one of ordinary skill in the art will readily appreciate that other forms of printing may be incorporated into the methods and systems of the present disclosure. For example, digital printing may be used to print the radar detectable marks on the golf ball layer. In this embodiment, the systems of the present disclosure may include one or more inkjet printing stations that allow for digital printing of the radar detectable marks.

Golf Balls Having Radar Detectable Marks

The present disclosure also provides golf balls having a radar detectable mark applied to a layer that are produced in accordance with the methods described above. The radar detectable marks on golf balls printed using the methods of the present disclosure have improved durability and radar reflectance after repeated impacts of the golf ball. The radar detectable marks printed using the methods of the present disclosure can also be positioned in a variety of locations on the golf ball layer, allowing manufacturers to create intricate patterns that improve radar detection and measurement accuracy.

The golf balls of the present disclosure may include one or more layers that have at least one radar detectable mark disposed on a surface thereof. In some embodiments, the golf ball layer may have more than one radar detectable mark printed on the surface thereof. The number of radar detectable marks may vary depending on the desired pattern. For example, the golf ball layer may have two or more radar detectable marks printed on the surface. In other embodiments, the golf ball layer may have ten or more radar detectable marks printed on the surface. In still other embodiments, the golf ball layer may have 25 or more radar detectable marks printed on the surface. In further embodiments, the golf ball layer may have 50 or more radar detectable marks printed on the surface. In still further embodiments, a golf ball layer made in accordance with the present disclosure has 60 radar detectable marks printed on the surface. Any number of radar detectable marks may be used on the golf ball layer so long as the one or more radar detectable marks allow for sufficient analysis of the radar signal.

Each radar detectable mark has a shape selected from a variety of suitable shapes, including regular shapes, irregular shapes, continuous shapes, and non-continuous shapes. Suitable examples of regular shapes include, but are not limited to, circles, rings, crescents, squares, triangles, rectangles, chevrons, and other regular polygons, irregular polygons, and basic nonpolygonal shapes. Suitable examples of irregular shapes include, but are not limited to, intersecting shapes, such as a series of intersecting stripes, where the length and width of each stripe within the series of intersecting stripes may be different than or substantially the same as that of the other stripe(s) within the series. For purposes of the present disclosure, stripes have substantially the same length and/or width if their respective lengths and/or widths differ by no more than 10 percent. In embodiments of the present disclosure where the golf ball includes more than one radar detectable mark on a single layer, the shape and/or size of one mark may be the same as or different from the shape and/or size of another mark. In embodiments of the present disclosure where the golf ball includes at least two layers having one or more radar detectable marks disposed on a surface thereof, the shape and/or size of a mark on one layer may be the same as or different from the shape and/or size of a mark on another layer.

In some embodiments, the radar detectable mark is designed to have dimensions (i.e., size and shape) such that every mathematically possible 0.025 inch wide great circle path on the golf ball layer surface on which the mark is disposed intersects the mark. In other embodiments, the radar detectable mark is designed to have dimensions (i.e., size and shape) such that every mathematically possible 0.015 inch wide great circle path on the golf ball layer surface on which the mark is disposed intersects the mark. In still other embodiments, the radar detectable mark is designed to have dimensions (i.e., size and shape) such that every mathematically possible 0.005 inch wide great circle path on the golf ball layer surface on which the mark is disposed intersects the mark. In yet other embodiments, the radar detectable mark is designed to have dimensions (i.e., size and shape) such that every mathematically possible great circle path on the golf ball layer surface on which the mark is disposed intersects the mark.

FIGS. 2A-2F show an exemplary pattern of radar detectable marks applied to a golf ball according to one embodiment of the present disclosure. The golf ball shown in FIGS. 2A-2F is printed with 60 non-continuous radar detectable marks in the form of rectangular stripes arranged in an icosahedron pattern. Each face of the golf ball includes ten stripes. All of the stripes in the pattern have substantially the same width and the same length. In the illustrated embodiment, the stripes have a width of about 0.039 inches and a length of about 0.350 inches. However, the width may vary from about 0.02 inches to about 0.20 inches, preferably about 0.04 inches to about 0.10 inches, and the length may vary from about 0.30 inches to about 2 inches, preferably about 0.35 inches to about 0.50 inches. In other embodiments, the stripes may be arranged in an icosahedron pattern and adjoined to form a continuous mark.

Other suitable shapes and patterns for radar detectable marks formed in accordance with the present disclosure are shown and described in U.S. application Ser. No. 17/553,122, filed on Dec. 16, 2021, the entire disclosure of which is incorporated by reference herein. For example, any of the regular and irregular shaped radar detectable marks described in U.S. application Ser. No. 17/553,122 may be utilized with the present disclosure, including those defined by intersecting rectangular stripes and those forming a closed loop.

The radar detectable marks may be printed on the golf balls such that the radar detectable marks have a certain total surface coverage. For purposes of the present disclosure, the total surface coverage of the mark(s) is calculated as the sum of the surface area of each radar detectable mark present on any layer, as measured with all of the marks present on the surface of any layer of the golf ball radially projected onto the outer surface of the ball, divided by the total surface area of the outer surface of the ball. In some embodiments, the radar detectable marks(s) have a total surface coverage of about 1 percent to about 20 percent. In other embodiments, the radar detectable marks(s) have a total surface coverage of about 2 percent to about 15 percent. In still other embodiments, the radar detectable marks(s) have a total surface coverage of about 5 percent to about 12 percent. In yet other embodiments, the radar detectable marks(s) have a total surface coverage of about 8 percent to about 10 percent.

Golf Ball Construction

The radar detectable marks described herein may be used with practically any type of ball construction. For instance, the golf ball may have a two-piece design, a double cover, or a thin urethane construction depending on the type of performance desired of the ball. Other suitable golf ball constructions include solid, wound, liquid-filled, and/or dual cores, and multiple intermediate layers.

Different materials may be used in the construction of golf balls according to the present disclosure. Suitable materials include, but are not limited to, thermosetting materials, such as polybutadiene, styrene butadiene, isoprene, polyisoprene, and trans-isoprene; thermoplastics, such as ionomer resins, polyamides and polyesters; and thermoplastic and thermosetting polyurethane and polyureas.

Particularly suitable thermosetting materials include, but are not limited to, thermosetting rubber compositions including a base polymer, an initiator agent, a coagent and/or a curing agent, and optionally one or more of a metal oxide, metal fatty acid or fatty acid, antioxidant, soft and fast agent, fillers, and additives. Suitable base polymers include natural and synthetic rubbers including, but not limited to, polybutadiene, polyisoprene, ethylene propylene rubber ("EPR"), styrene-butadiene rubber, styrenic block copolymer rubbers (such as SI, SIS, SB, SBS, SIBS, and the like, where "S" is styrene, "I" is isobutylene, and "B" is butadiene), butyl rubber, halobutyl rubber, polystyrene elastomers, polyethylene elastomers, polyurethane elastomers, polyurea elastomers, metallocene-catalyzed elastomers and plastomers, copolymers of isobutylene and para-alkylstyrene, halogenated copolymers of isobutylene and para-alkylstyrene, acrylonitrile butadiene rubber, polychloroprene, alkyl acrylate rubber, chlorinated isoprene rubber, acrylonitrile chlorinated isoprene rubber, polyalkenamers, and combinations of two or more thereof. Suitable initiator agents include organic peroxides, high energy radiation sources capable of generating free radicals, C-C initiators, and combinations thereof. Suitable coagents include, but are not limited to, metal salts of unsaturated carboxylic acids; unsaturated vinyl compounds and polyfunctional monomers (e.g., trimethylolpropane trimethacrylate); phenylene bismaleimide; and combinations thereof. Suitable curing agents include, but are not limited to, sulfur; N-oxydiethylene 2-benzothiazole sulfenamide; N,N-di-ortho-tolylguanidine; bismuth dimethyldithiocarbamate; N-cyclohexyl 2-benzothiazole sulfenamide; N,N-diphenylguanidine; 4-morpholinyl-2-benzothiazole disulfide; dipentamethylenethiuram hexasulfide; thiuram disulfides; mercaptobenzothiazoles; sulfenamides; dithiocarbamates; thiuram sulfides; guanidines; thioureas; xanthates; dithiophosphates; aldehyde-amines; dibenzothiazyl disulfide; tetraethylthiuram disulfide; tetrabutylthiuram disulfide; and combinations thereof.

Other suitable materials for the golf balls of the present disclosure may also include, but are not limited to: thermosetting polyurethanes, polyureas, and hybrids of polyurethane and polyurea; thermoplastic polyurethanes, polyureas, and hybrids of polyurethane and polyurea, including, for example, Estane® TPU, commercially available from The Lubrizol Corporation; E/X- and E/X/Y-type ionomers, where E is an olefin (e.g., ethylene), X is a carboxylic acid (e.g., acrylic, methacrylic, crotonic, maleic, fumaric, or itaconic acid), and Y is a softening comonomer (e.g., vinyl esters of aliphatic carboxylic acids wherein the acid has from 2 to 10 carbons, alkyl ethers wherein the alkyl group has from 1 to 10 carbons, and alkyl alkylacrylates such as alkyl methacrylates wherein the alkyl group has from 1 to 10 carbons), such as Surlyn® ionomer resins commercially available from The Dow Chemical Company; polyisoprene; polyoctenamer, such as Vestenamer® polyoctenamer, commercially available from Evonik Industries; polyethylene, including, for example, low density polyethylene, linear low density polyethylene, and high density polyethylene; polypropylene; rubber-toughened olefin polymers; non-ionomeric acid copolymers; plastomers; flexomers; styrene/butadiene/styrene block copolymers; styrene/ethylene-butylene/styrene block copolymers; polybutadiene; styrene butadiene rubber; ethylene propylene rubber; ethylene propylene diene rubber; dynamically vulcanized elastomers; ethylene vinyl acetates; ethylene (meth) acrylates; polyvinyl chloride resins; polyamides, amide-ester elastomers, and copolymers of ionomer and polyamide, including, for example, Pebax® thermoplastic polyether and polyester amides, commercially available from Arkema Inc; crosslinked trans-polyisoprene; polyester-based thermoplastic elastomers, such as Hytrel® polyester elastomers, commercially available from E. I. du Pont de Nemours and Company, and Riteflex® polyester elastomers, commercially available from Ticona; polyurethane-based thermoplastic elastomers, such as Elastollan® polyurethanes, commercially available from BASF; synthetic or natural vulcanized rubber; and combinations thereof.

The United States Golf Association specifications limit the minimum size of a competition golf ball to 1.680 inches. There is no specification as to the maximum diameter, and golf balls of any size can be used for recreational play. Golf balls made in accordance with the present disclosure can have an overall diameter of any size, and, typically, have an overall diameter of from 1.680 inches to 1.780 inches. Dimensions of each golf ball layer, for example, thickness and diameter, may vary depending on the desired properties.

Golf balls of the present disclosure have a plurality of dimples on the outer surface thereof. In some embodiments, the golf balls of the present disclosure have an overall dimple surface coverage of 60 percent or greater. In other embodiments, the golf balls of the present disclosure have an overall dimple surface coverage of 65 percent or greater. In still other embodiments, the golf balls of the present disclosure have an overall dimple surface coverage of 75 percent or greater. In yet other embodiments, the golf balls of the present disclosure have an overall dimple surface coverage of 80 percent or greater.

The golf balls and methods described and claimed herein are not to be limited in scope by the specific embodiments herein disclosed, since these embodiments are intended as illustrations of several aspects of the disclosure. Any equivalent embodiments are intended to be within the scope of this disclosure. Indeed, various modifications of the golf balls and the methods in addition to those shown and described herein will become apparent to those skilled in the art from the foregoing description. Such modifications are also intended to fall within the scope of the appended claims. All patents and patent applications cited in the foregoing text are expressly incorporated herein by reference in their entirety. Any section headings herein are provided only for consistency with the suggestions of 37 C.F.R. § 1.77 or otherwise to provide organizational queues. These headings shall not limit or characterize the invention(s) set forth herein.

What is claimed is:

1. A method of printing a radar detectable mark on a surface of a golf ball, comprising:
- providing a plurality of pad printing stations, wherein each pad printing station comprises:
  - a printing pad and
  - a first image plate and a second image plate each having an etching of the radar detectable mark with electrically conductive ink applied therein, wherein the etching of the first image plate has a first depth, the etching of the second image plate has a second depth, and the first depth and the second depth are different;
- transferring the golf ball to a first pad printing station, wherein the electrically conductive ink is applied to the printing pad from the first image plate to provide an inked printing pad;
- contacting a first portion of the surface of the golf ball with the inked printing pad to apply a first ink layer;
- applying the electrically conductive ink from the second image plate to the printing pad; and
- repeating the contacting step to apply a second ink layer, wherein the first ink layer and the second ink layer form a first radar detectable mark on the first portion of the surface.

2. The method of claim 1, wherein the etching of the radar detectable mark has a depth of about 15 μm to about 35 μm.

3. The method of claim 1, further comprising drying the radar detectable marks using at least one of: forced ambient air or heated air having a temperature of about 60° F. or greater, wherein the heated air is a by-product of cooling a UV-curable light source.

4. The method of claim 1, further comprising applying an adhesion-promoting layer to the surface of the golf ball.

5. The method of claim 1, wherein the surface of the golf ball is any layer of the golf ball other than an outermost surface.

6. The method of claim 1, wherein the electrically conductive ink comprises a base resin and an electrically conductive material.

7. The method of claim 6, wherein the base resin is selected from the group consisting of vinyl polymers, urethane polymers, acrylic polymers, epoxy polymers, and combinations of two or more thereof, and the electrically conductive material is selected from the group consisting of silver, conductive carbon, aluminum, graphene, nanotubes, nanometals, and combinations of two or more thereof.

8. A method of printing a plurality of radar detectable marks on a surface of a golf ball, comprising providing a plurality of pad printing stations, wherein each pad printing station comprises:

a printing pad and a first image plate and a second image plate each having an etching of the radar detectable mark with electrically conductive ink applied therein, wherein the etching of the first image plate has a first depth and the etching of the second image plate has a second depth, wherein the first depth and the second depth range from about 10 μm to about 40 μm and the first depth and the second depth are different;

transferring the golf ball to a first pad printing station, applying the electrically conductive ink from the first image plate to the printing pad to provide an inked printing pad;

contacting a first portion of the surface of the golf ball with the inked printing pad to apply a first ink layer;

applying the electrically conductive ink from the second image plate to the printing pad;

contacting the first portion of the surface of the golf ball with the inked printing pad to apply a second ink layer, wherein the first ink layer and the second ink layer form a first radar detectable mark on the first portion of the surface;

rotating the golf ball to a second portion of the surface;

transferring the golf ball to a second pad printing station; and contacting the second portion of the surface of the golf ball with the inked printing pad to form a second radar detectable mark on the second portion of the surface.

9. The method of claim 8, wherein the first depth is about 10 μm to about 20 μm and the second depth is about 20 μm to about 30 μm.

10. The method of claim 8, further comprising drying the first radar detectable mark and the second radar detectable mark using at least one of: forced ambient air or heated air having a temperature of about 60° F. or greater, wherein the heated air is a by-product of cooling a UV-curable light source.

11. The method of claim 8, further comprising applying a cover layer over the surface of the golf ball.

12. The method of claim 8, wherein the rotating step comprises rotating the golf ball about one or more axes without substantially moving the center of the golf ball.

* * * * *